2,809,969
ISOQUINOLONE DERIVATIVES

Merrill Eugene Speeter, Kalamazoo, Mich., assignor to Bristol Laboratories Inc., Syracuse, N. Y., a corporation of New York No Drawing. Application November 7, 1955, Serial No. 545,522

6 Claims. (Cl. 260—247.5)

This invention relates to a new class of therapeutically useful organic compounds and methods of preparation thereof. More particularly, the invention relates to a series of substituted 4-phenyl-1,2,3,4-tetrahydro-3-isoquinolones, such as 2-dialkylaminoalkyl-4-phenyl-1,2,3,4-tetrahydro-3-isoquinolones.

This application is a continuation-in-part of my prior, co-pending application Serial No. 337,657, filed February 18, 1953 now abandoned.

The new compounds include free bases, non-toxic acid addition salts and quaternary salts, whose free bases are represented by the following general formula:

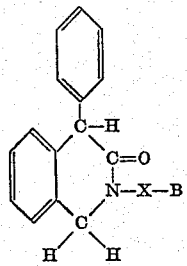

wherein X represents an alkylene radical containing two to four carbon atoms and B represents di-(lower)alkylamino, piperidino, morpholino, pyrrolidino, N'-(lower)alkylpiperazino or pipecolino.

The compounds of this invention are useful in medicine as antispasmodic agents and as central nervous system depressants, e. g. as anti-convulsants, sedatives, analgesics or tranquillizers. The free bases are useful as intermediates in the preparation of the quaternary salts, which are useful as germicides and disinfectants.

The compounds of this invention are prepared by reacting a N-dialkylaminoalkyl-benzylamine with acetylmandelyl chloride to give an O-acetyl-N-benzyl-N-dialkylamino-alkylmandelamide which is then cyclized by reaction with sulfuric acid to give the desired 2-dialkylaminoalkyl-4-phenyl-1,2,3,4-tetrahydro-3-isoquinolone.

The following examples will serve to illustrate the invention without limiting it thereto.

EXAMPLE I

A. O-acetyl-N-dimethylaminoethyl-N-benzylmandelamide

A mixture of 15.5 g. (0.087 mole) of N-dimethylaminoethylbenzylamine, 18.5 g. (0.087 mole) of acetylmandelyl chloride and 6.9 g. (0.087 mole) of pyridine is refluxed in 300 ml. of benzene for three hours. Solid amine hydrochlorides are removed by filtration and the benzene layer is extracted with dilute hydrochloric acid. Addition of sodium hydroxide to the acid extracts liberates an oil which is extracted into ether. Concentration of the ethereal solution gives an oil which solidifies, giving crystals which are recrystallized from petroleum ether of B. P. 60°–71° C. The crystalline O-acetyl-N-dimethylaminoethyl-N-benzylmandelamide melts at 78°–81° C.

Analysis.—Calculated for $C_{21}H_{26}N_2O_3$:

|   | Calculated | Found |
|---|---|---|
| C | 71.16 | 71.50 |
| H | 7.39 | 7.38 |

A large part of the starting material may be isolated from the mixture of hydrochloride salts removed from the reaction mixture by filtration.

B. 2-dimethylaminoethyl-4-phenyl-1,2,3,4-tetrahydro-3-isoquinolone hydrogen sulfate

Ten grams (0.028 mole) of O-acetyl-N-dimethylaminoethyl-N-benzylmandelamide is dissolved in 50 ml. of concentrated sulfuric acid. After five hours at room temperature, this mixture is poured on ice. The solution is made basic with ammonium hydroxide and the liberated oil is extracted into ether. The dried ethereal solution is concentrated, leaving as the residual oil 2-dimethylaminoethyl-4-phenyl-1,2,3,4-tetrahydro-3-isoquinolone.

This residual oil is dissolved in 40 ml. of isopropyl alcohol and excess, concentrated sulfuric acid is added. The sulfate salt separates on cooling and melts at 183°–184° C. after recrystallization from isopropyl alcohol-ethyl acetate.

Analysis.—Calculated for $C_{19}H_{22}N_2O \cdot H_2SO_4$:

|   | Calculated | Found |
|---|---|---|
| C | 58.15 | 58.25 |
| H | 6.16 | 6.40 |

The solid quaternary salt, 2-dimethylaminoethyl-4-phenyl-1,2,3,4-tetrahydro-3-isoquinolone methiodide is prepared by refluxing the free base in ten moles of methyl iodide for eighteen hours and then removing the excess methyl iodide by distillation in vacuo.

EXAMPLE II 2-beta-N-piperidylethyl-4-phenyl-1,2,3,4-tetrahydro-3-isoquinolone, its sulfate salt and its methiodide are prepared according to the procedures set forth in detail in Example I, using N-beta-piperidylethyl-benzylamine in place of N-dimethylaminoethyl-benzylamine.

Using the procedure set forth in detail in Example I, N-diethylaminoethyl-benzylamine, N-di-n-butylaminoethyl-benzylamine, N-ethylmethylamino-ethyl-benzylamine, N-[2-(α-pipecolyl)-ethyl]-benzylamine, N-β-morpholinylethyl-benzylamine, N-[β-(4-ethylpiperazyl)-ethyl]-benzylamine, N-β-pyrrolidylethylbenzylamine, N-(β-diethylamino-propyl)-benzylamine, N-(β-piperidylpropyl)-benzylamine, N-(β-piperidyl-α-methyl-ethyl)-benzylamine, N-(β-dimethylamino-α-methyl-propyl)-benzylamine, N-(β-diethylamino-α,β-dimethylethyl)-benzylamine and N-(β-piperidyl-α,β-dimethyl-ethyl)-benzylamine are used to prepare 2-diethylaminoethyl-4-phenyl-1,2,3,4-tetrahydro-3-isoquinolone, 2-di-n-butylaminoethyl-4-phenyl-1,2,3,4-tetrahydro-3-isoquinolone, 2-ethyl-methyl-aminoethyl-4-phenyl-1,2,3,4-tetrahydro-3-isoquinolone, 2-[2-(α-pipecolyl)-ethyl]-4-phenyl-1,2,3,4-tetrahydro-3-isoquinolone, 2-β-(morpholinyl)ethyl-4-phenyl-1,2,3,4-tetrahydro-3-isoquinolone, 2-[β-(4-ethylpiperazyl)ethyl]-4-phenyl-1,2,3,4-tetrahydro-3-isoquinolone, 2-β-(pyrrolidyl)ethyl-4-phenyl-1,2,3,4-tetrahydro-3-isoquinolone, 2-[β-(diethylamino)propyl]-4-phenyl-1,2,3,4-tetrahydro-3-isoquinolone, 2-[β-(piperidyl)propyl]-4-phenyl-1,2,3,4-tetrahydro-3-isoquinolone, 2-(β-piperidyl-α-methyl-ethyl)-4-phenyl-1,2,3,4-tetrahydro-3-isoquinolone, 2-(β-dimethylamino-α- methyl - propyl) - 4 - phenyl - 1,2,3,4 - tetrahydro - 3-isoquinolone, 2 - (β - diethylamino - α,β - dimethyl-ethyl) - 4 - phenyl - 1,2,3,4 - tetrahydro - 3 - isoquinolone, and 2(β - piperidyl-α,β - dimethyl - ethyl) - 4 - phenyl-1,2,3,4 - tetrahydro - 3 - isoquinolone, respectively. These free bases are converted by treatment with acids to acid addition salts such as hydrochlorides, phosphates, sulfates, hydrobromides, citrates, acetates, tartrates, benzoates, maleates and the like and by treatment with alkyl halides or alkyl sulfates to quaternary salts such as methochlorides, methobromides, methiodides, ethiodides, ethochlorides, ethyl sulfates and the like.

I claim:

1. A member selected from the group consisting of compounds having the structure

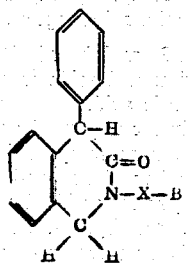

wherein X represents an alkylene radical containing two to four carbon atoms inclusive and B represents a member selected from the group consisting of di-(lower)alkylamino, piperidino, morpholino, pyrrolidino, N'-(lower)alkyl-piperazino and pipecolino; and non-toxic acid addition salts and quaternary salts of said compounds.

2. 2 - dimethylaminoethyl - 4 - phenyl - 1,2,3,4 - tetrahydro-3-isoquinolone.

3. 2 - beta - N - piperidylethyl - 4 - phenyl - 1,2,3,4-tetrahydro-3-isoquinolone.

4. 2 - [2 - (α - pipecolyl) - ethyl] - 4 - phenyl - 1,2,3,4-tetrahydro-3-isoquinolone.

5. 2 - β - (morpholinyl)ethyl - 4 - phenyl - 1,2,3,4-tetrahydro-3-isoquinolone.

6. 2 - [β - (diethylamino)propyl] - 4 - phenyl - 1,2,3,4-tetrahydro-3-isoquinolone.

No references cited.